(12) United States Patent
Minoo et al.

(10) Patent No.: US 9,319,711 B2
(45) Date of Patent: *Apr. 19, 2016

(54) JOINT SUB-PIXEL INTERPOLATION FILTER FOR TEMPORAL PREDICTION

(75) Inventors: Koohyar Minoo, San Diego, CA (US); Jian Lou, San Diego, CA (US); David M. Baylon, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 527 days.

This patent is subject to a terminal disclaimer.

(21) Appl. No.: 13/540,270

(22) Filed: Jul. 2, 2012

(65) Prior Publication Data

US 2013/0003841 A1    Jan. 3, 2013

Related U.S. Application Data

(60) Provisional application No. 61/504,139, filed on Jul. 1, 2011, provisional application No. 61/506,586, filed on Jul. 11, 2011, provisional application No. 61/535,941, filed on Sep. 16, 2011, provisional application No.

(Continued)

(51) Int. Cl.
*H04N 7/32* (2006.01)
*H04N 19/577* (2014.01)
(Continued)

(52) U.S. Cl.
CPC ............ *H04N 19/577* (2014.11); *G06T 7/2026* (2013.01); *H04N 19/117* (2014.11); *H04N 19/139* (2014.11); *H04N 19/176* (2014.11); *H04N 19/523* (2014.11); *H04N 19/82* (2014.11)

(58) Field of Classification Search
CPC ....................................... H04N 7/32

USPC ...................................... 375/240.12
See application file for complete search history.

(56) References Cited

U.S. PATENT DOCUMENTS 5,511,137 A    4/1996   Okada
6,252,576 B1   6/2001   Nottingham
(Continued)

FOREIGN PATENT DOCUMENTS

EP    1359763    11/2003
EP    1507415     2/2005
(Continued)

OTHER PUBLICATIONS

Google Patent history log.pdf.*
(Continued)

*Primary Examiner* — William C Vaughn, Jr.
*Assistant Examiner* — Luis Perez Fuentes
(74) *Attorney, Agent, or Firm* — Young Basile Hanlon & MacFarlane P.C.

(57) ABSTRACT

A method determines a plurality of interpolation filters for use in interpolating sub-pel values for a temporal prediction process of video content. The plurality of interpolation filters are designed based on sub-pel offsets for two reference blocks. The method determines a first sub-pel offset for a first reference block for the unit of video content and determines a second sub-pel offset for a second reference block for a unit of video content. A set of interpolation filters is determined to interpolate a set of sub-pel pixel values for use in the temporal prediction process for the unit of video content. The set of interpolation filters is designed for the first sub-pel offset and the second sub-pel offset and is used to interpolate a first sub-pel pixel value for the first reference block and a second sub-pel value for the second reference block.

19 Claims, 4 Drawing Sheets

Related U.S. Application Data

61/538,107, filed on Sep. 22, 2011, provisional application No. 61/539,420, filed on Sep. 26, 2011, provisional application No. 61/557,422, filed on Nov. 9, 2011.

(51) Int. Cl.

| | |
|---|---|
| *G06T 7/20* | (2006.01) |
| *H04N 19/139* | (2014.01) |
| *H04N 19/176* | (2014.01) |
| *H04N 19/117* | (2014.01) |
| *H04N 19/82* | (2014.01) |
| *H04N 19/523* | (2014.01) |

(56) References Cited

U.S. PATENT DOCUMENTS

| | | | |
|---|---|---|---|
| 7,155,213 B1 | 12/2006 | Almeda et al. | |
| 7,224,733 B1* | 5/2007 | Benzler | H04N 19/523 348/699 |
| 7,349,473 B2* | 3/2008 | Hallapuro | H04N 19/139 348/699 |
| 7,505,636 B2 | 3/2009 | MacInnis et al. | |
| 7,555,043 B2 | 6/2009 | Sato et al. | |
| 7,660,471 B2 | 2/2010 | Bjontegaard | |
| 7,778,494 B2 | 8/2010 | Shastry et al. | |
| 7,958,177 B2 | 6/2011 | Zhu | |
| 7,965,177 B2 | 6/2011 | Kobayashi et al. | |
| 8,208,564 B2 | 6/2012 | Bossen et al. | |
| 8,437,581 B2 | 5/2013 | Lou et al. | |
| 8,451,889 B2 | 5/2013 | Lee et al. | |
| 8,565,558 B2 | 10/2013 | Lou et al. | |
| 8,576,906 B2* | 11/2013 | Andersson et al. | 375/240.03 |
| 8,792,559 B2* | 7/2014 | Robertson | G06T 7/2026 375/240.12 |
| 8,811,484 B2* | 8/2014 | Motta | H04N 19/147 375/240.01 |
| 2003/0112864 A1 | 6/2003 | Karczewicz et al. | |
| 2003/0156646 A1* | 8/2003 | Hsu et al. | 375/240.16 |
| 2003/0194007 A1 | 10/2003 | Chen et al. | |
| 2003/0194009 A1 | 10/2003 | Srinivasan | |
| 2004/0062307 A1 | 4/2004 | Hallapuro et al. | |
| 2004/0076333 A1 | 4/2004 | Zhang et al. | |
| 2004/0213470 A1 | 10/2004 | Sato et al. | |
| 2005/0010561 A1 | 1/2005 | de Bois et al. | |
| 2005/0105611 A1 | 5/2005 | Bjontegaard | |
| 2006/0133506 A1 | 6/2006 | Dang | |
| 2006/0268991 A1 | 11/2006 | Segall et al. | |
| 2006/0294171 A1 | 12/2006 | Bossen et al. | |
| 2007/0133687 A1 | 6/2007 | Wittmann et al. | |
| 2008/0075165 A1 | 3/2008 | Ugur et al. | |
| 2008/0089418 A1 | 4/2008 | Kim et al. | |
| 2008/0166068 A1 | 7/2008 | Fuchigami | |
| 2008/0205793 A1 | 8/2008 | Nilsson et al. | |
| 2009/0016634 A1 | 1/2009 | Cox et al. | |
| 2009/0257499 A1 | 10/2009 | Karczewicz et al. | |
| 2009/0257503 A1 | 10/2009 | Ye et al. | |
| 2010/0002770 A1 | 1/2010 | Motta et al. | |
| 2010/0111182 A1* | 5/2010 | Karczewicz | H04N 19/147 375/240.16 |
| 2010/0135398 A1 | 6/2010 | Wittmann et al. | |
| 2010/0246998 A1 | 9/2010 | He et al. | |
| 2011/0116546 A1 | 5/2011 | Guo et al. | |
| 2011/0200108 A1 | 8/2011 | Joshi et al. | |
| 2011/0243471 A1* | 10/2011 | Alshina et al. | 382/248 |
| 2011/0249737 A1 | 10/2011 | Joshi et al. | |
| 2012/0008686 A1 | 1/2012 | Haskell | |
| 2012/0183068 A1 | 7/2012 | Lou et al. | |
| 2012/0224639 A1 | 9/2012 | Lou et al. | |
| 2012/0230407 A1 | 9/2012 | Minoo et al. | |
| 2012/0230413 A1* | 9/2012 | Lou | H04N 19/46 375/240.16 |
| 2012/0328020 A1 | 12/2012 | Lou et al. | |
| 2013/0003841 A1* | 1/2013 | Minoo | H04N 19/139 375/240.12 |
| 2013/0051463 A1* | 2/2013 | Minoo | H04N 19/139 375/240.12 |
| 2013/0114677 A1 | 5/2013 | Baylon et al. | |
| 2014/0078394 A1 | 3/2014 | Lou et al. | |

FOREIGN PATENT DOCUMENTS

| | | |
|---|---|---|
| EP | 1973350 | 9/2008 |
| WO | WO2004006558 | 1/2004 |
| WO | WO2006006609 | 1/2006 |
| WO | WO2007011189 | 1/2007 |
| WO | WO2010039288 | 4/2010 |
| WO | WO2011046587 | 4/2011 |

OTHER PUBLICATIONS

PCT Search Report & Written Opinion, RE: Application #PCT/US2012/045297; Oct. 2, 2012.

Ji et al., "Block-Wise Adaptive Motion Accuracy Based B-Picture Coding With Low-Complexity Motion Compensation," IEEE Transactions on Circuits and Systems for Video Technology; vol. 17, No. 8; Aug. 1, 2007; pp. 1085-1090.

Alshina E. et al.:"CE3: Experimental results of DCTIF by Samsung", 4,JCT-VC Meeting; 95, MPEG Meeting; Daegu; (Joint Collaborative Team on Video Coding of ISO/IEC JTC1/SC29/WG1 and ITU-T SG.16),No. JCTVC-D344, Jan. 15, 2011, Sections 1,2 and 6.

Chujoh, T., et al., Core Experiment 3: Motion Compensation Interpolation, JCTVC-E703r3, Apr. 11, 2011.

H.26L Test Model Long Term No. 3 (TML-3) Draft 0, ITU-T Telecommunication Standardization Sector of ITU; May 16, 2000, pp. 1-24.

ISR & Written Opinion , RE: Application # PCT/US2012/028467; May 22, 2012.

ISR and Written Opinion of the International Searching Authority, for Int'l Application No. PCT/US2012/021912; Mar. 12, 2012.

ISR, "ISR Search Report and Written Opinion of the International Searching Authority" for International Application No. ISR/US2013/056017 dated Oct. 15, 2013, 13 pages.

ISR, & Written Opinion of the International Searching Authority for InternationalApplication No. ISR/US2012/027213, May 2, 2012, 11 pages.

ISR, & Written Opinion of the International Searching Authority for InternationalApplication No. ISR/US2012/027227,May 2, 2012, 13 pages.

ISR/WO PCT/US2012044039, related matter Nov. 12, 2012.

Lou_J et al.: "New DCT-based interpolation filters", 95. MPEG Meeting; Daegu; (Motion Picture Expert Group or ISO/IEC JTC1/SC29/WG11), No. m19007, JCTVC-D246 Jan. 20, 2011, section 3.

Sato K., et al., "Adaptive MC Interpolation Filter for Complexity Reduction" No. JVT-C052, May 6, 2002, pp. 1-6.

Lou J. et al., "Motorola Mobility's adaptive interpolation filter" JVTCV-E359, MPEG Meeting: Geneva, Mar. 16, 2011.

Sato K. et al.; "Adaptive MC interpolation for memory access reduction in JVT video coding," Seventh International Symposium on Signal Processing and its Applications; vol. 1; Jul. 1, 2003; pp. 77-80.

Wedi T et al.: "Motion-and aliasing-compensated prediction for hybrid video coding", IEE Transactions on Circuits and Systems for video Technology, IEE Service Center, Piscataway, NJ, US,vol. 13, No. 7, Jul. 1, 2003, pp. 577-586.

Wedi: "New Results on Adaptive Interpolation Filter", 3, JVT-VC Meeting; 60. MPEG Meeting; Fairfax,US; (Joint Collaborative Team of ISO/IEC/JTC1/SC29/WG11 and ITU-T SG.16), No. JVT-C059, May 10, 2002, Sections 1 and 2.

Wiegand et al, "Overview of the H 264/AVC Video Coding Standard," IEEE Transactions on Circuits and Systems for Video Technology, vol. 13, No. 7, pp. 568, 569, Jul. 1, 2003.

Xiong L.: "Spatial upsampling filter,"17, JVT Meeting; 74. MPEG Meeting; 14*Oct. 2005; Nice, FR (Joint Video Team of ISO/IEC JTC1/SC29/WG11 and ITU-T SG16_, No. JVT-Q051, Oct. 11, 2005, all pages.

Yoshino T.,et al.; "Enhanced switching of interpolation filter for HEVC," Motion Picture Expert Group or ISO/IEC; Oct. 28, 2010.

(56) References Cited

OTHER PUBLICATIONS

Bankoski et al. "VP8 Data Format and Decoding Guide; draft-bankoski-vp8-bitstream-02" Network Working Group. Internet-Draft, May 18, 2011, pp. 11-15, 121-128.

Bankoski et al. "VP8 Data Format and Decoding Guide; draft-bankoski-vp8-bitstream-02" Network Working Group. Internet-Draft, May 18, 2011, 288 pp. pp. 11-15 and 121-128.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Overview; VP7 Data Format and Decoder. Version 1.5. On2 Technologies, IxNC. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, IxNC. Dated Aug. 17, 2006.

VP6 Bitstream & Decoder Specification. Version 1.03. On2 Technologies, IxNC. Dated Oct. 29, 2007.

VP8 Data Format and Decoding Guide. WebM Project. Google On2. Dated: Dec. 1, 2010.

\* cited by examiner

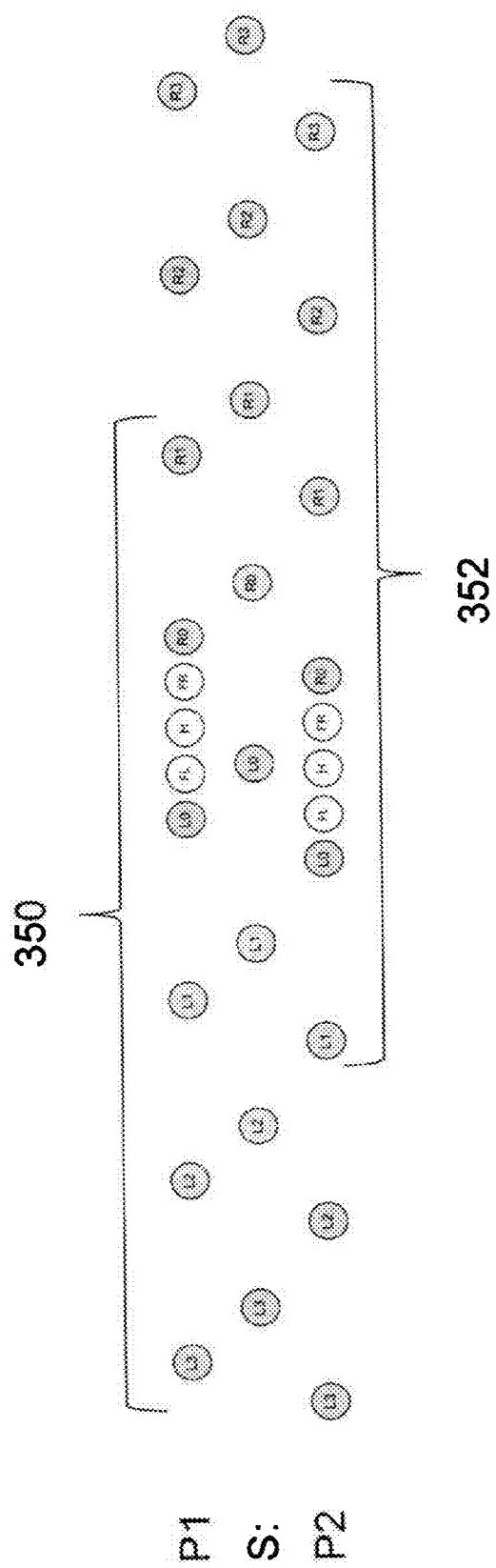

JOINT SUB-PIXEL INTERPOLATION FILTER FOR TEMPORAL PREDICTION

CROSS REFERENCE TO RELATED APPLICATIONS

The present application claims priority to:

U.S. Provisional App. No. 61/504,139 for "Method for Multi-Hypothesis Joint Sub-Pixel Interpolation Filters for Motion Compensation" filed Jul. 1, 2011;

U.S. Provisional App. No. 61/506,586 for "4tap, 5tap and 6tap Multi-Hypothesis Joint Sub-pixel Interpolation Filters for Motion Compensation" filed Jul. 11, 2011;

U.S. Provisional App. No. 61/535,941 for "6tap and 8tap Multi-Hypothesis Joint Sub-pixel Interpolation Filters for Motion Compensation" filed Sep. 16, 2011;

U.S. Provisional App. No. 61/538,107 for "Combined 6tap and 8tap Multi-Hypothesis Partially Joint Sub-pixel Interpolation Filters for Motion Compensation" filed Sep. 22, 2011;

U.S. Provisional App. No. 61/539,420 for "Multi-Hypothesis Joint Sub-pixel Interpolation Filters with DC-Gain Constraint for Motion Compensation" filed Sep. 26, 2011;

U.S. Provisional App. No. 61/557,422 for "Sub-pixel Motion Compensation Interpolation Based on the Number of Predictor blocks" filed Nov. 9, 2011, the contents of all of which are incorporated herein by reference in their entirety.

BACKGROUND

High-efficiency video coding (HEVC) is a block-based hybrid spatial and temporal predictive coding scheme. Similar to other video coding standards, such as motion picture experts group (MPEG)-1, MPEG-2, and MPEG-4, HEVC supports intra-picture, such as I picture, and inter-picture, such as B picture. In HEVC, P and B pictures are consolidated into a general B picture that can be used as a reference block.

Intra-picture is coded without referring to any other pictures. Thus, only spatial prediction is allowed for a coding unit (CU)/prediction unit (PU) inside an intra-picture. Inter-picture, however, supports both intra- and inter-prediction. A CU/PU in an inter-picture may be either spatially or temporally predictive coded. Temporal predictive coding may reference blocks that were previously coded.

Temporal motion prediction is an effective method to increase the coding efficiency and provides high compression. HEVC uses a translational model for motion prediction. According to the translational model, a prediction signal for a given block in a current picture is generated from a corresponding block in a reference block. The coordinates of the reference block are given by a motion vector that describes the translational motion along horizontal (x) and vertical (y) directions that would be added/subtracted to/from the coordinates of the current block. A decoder needs the motion vector to decode the compressed video.

The pixels in the reference block are used as the prediction. In one example, the motion may be captured in integer pixels. However, not all objects move with the spacing of integer pixels (also referred to as pel). For example, since an object motion is completely unrelated to the sampling grid, sometimes the object motion is more like sub-pel (fractional) motion than a full-pel one. Thus, HEVC allows for motion vectors with sub-pel accuracy.

In order to estimate and compensate sub-pel displacements, the image signal on these sub-pel positions is generated by an interpolation process. In HEVC, sub-pel interpolation is performed using finite impulse response (FIR) filters. Generally, the filter may have 8 taps to determine the sub-pel values for sub-pel positions, such as half-pel and quarter-pel positions. The taps of an interpolation filter weight the integer pixels with coefficient values to generate the sub-pel signals. Different coefficients may produce different compression performance in signal distortion and noise.

HEVC uses a specific interpolation filter for motion estimation for each reference block based on the choice of sub-pel position for that reference block. In bi-prediction, two reference blocks may be used to predict a current block. One reference block is found on a list 0 and the other reference block is found on a list 1. If the choice of the sub-pel position is a half-pel shift for list 0, then a half-pel interpolation filter is applied to the reference block in list 0. Also, if the choice of the sub-pel position is a quarter-pel shift for list 1, then a quarter-pel interpolation filter is determined for list 1. The same half-pel interpolation filter is applied to the reference block in list 0 even if the sub-pel position for list 1 changes, such as to a half-pel shift.

SUMMARY

In one embodiment, a method for encoding or decoding video content is provided. The method determines a plurality of interpolation filters for use in interpolating sub-pel values for a temporal prediction process of video content. The plurality of interpolation filters are designed based on sub-pel offsets for two reference blocks. The method then determines a first sub-pel offset for a first reference block for a unit of video content and determines a second sub-pel offset for a second reference block for the unit of video content. A set of interpolation filters is determined to interpolate a set of sub-pel pixel values for use in the temporal prediction process for the unit of video content. The set of interpolation filters is designed for the first sub-pel offset and the second sub-pel offset and is used to interpolate a first sub-pel pixel value for the first reference block and a second sub-pel value for the second reference block.

In one embodiment, an apparatus is configured to encode or decode video content. The apparatus includes: one or more computer processors; and a computer-readable storage medium comprising instructions, that when executed, control the one or more computer processors to be configured for: determining a plurality of interpolation filters for use in interpolating sub-pel values for a temporal prediction process of video content, wherein the plurality of interpolation filters are designed based on sub-pel offsets for two reference blocks; determining a first sub-pel offset for a first reference block for a unit of video content; determining a second sub-pel offset for a second reference block for the unit of video content; and determining a set of interpolation filters to interpolate a set of sub-pel pixel values for use in the temporal prediction process for the unit of video content, wherein the set of interpolation filters is designed for the first sub-pel offset and the second sub-pel offset and used to interpolate a first sub-pel pixel value for the first reference block and a second sub-pel value for the second reference block.

In one embodiment, a non-transitory computer-readable storage medium is provided including instructions for encoding or decoding video content, the instructions, when executed, control a computer system to be configured for: determining a plurality of interpolation filters for use in interpolating sub-pel values for a temporal prediction process of video content, wherein the plurality of interpolation filters are designed based on sub-pel offsets for two reference blocks; determining a first sub-pel offset for a first reference block for a unit of video content; determining a second sub-pel offset for a second reference block for the unit of video content; and determining a set of interpolation filters to interpolate a set of sub-pel pixel values for use in the temporal prediction process for the unit of video content, wherein the set of interpolation filters is designed for the first sub-pel offset and the second sub-pel offset and used to interpolate a first sub-pel pixel value for the first reference block and a second sub-pel value for the second reference block.

The following detailed description and accompanying drawings provide a more detailed understanding of the nature and advantages of the present invention.

BRIEF DESCRIPTION OF THE DRAWINGS

FIG. 3 depicts an example showing an offset for interpolation filters 106 according to one embodiment.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Overview

Figure 1:
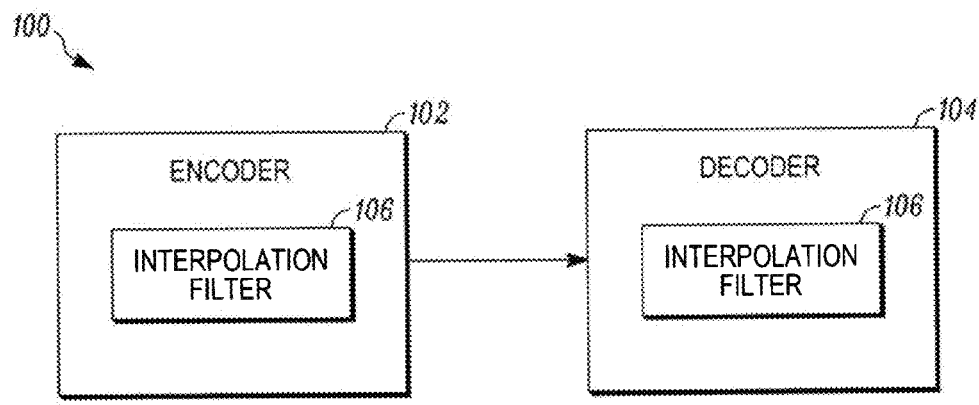
FIG. 1 depicts an example of a system for encoding and decoding video content according to one embodiment.

FIG. 1 depicts an example of a system 100 for encoding and decoding video content according to one embodiment. System 100 includes an encoder 102 and a decoder 104, both of which will be described in more detail below. Encoder 102 and decoder 104 perform temporal prediction through motion estimation and motion compensation. Motion estimation is a process of determining a motion vector (MV) for a current unit of video. Motion compensation is applying the motion vector to a current unit being encoded or decoded. For example, the temporal prediction searches for a best match prediction for a current prediction unit (PU) over reference blocks. The reference block may refer to any unit of video content, such as a block, picture, or a frame. The best match prediction is described by the motion vector and associated reference blocks or pictures ID. Also, a PU in a B picture may have up to two motion vectors.

The temporal prediction allows for fractional (sub-pel) picture accuracy. Sub-pel prediction is used because motion during two instances of time (the current and reference blocks' capture times) can correspond to a sub-pel position in pixel coordinates and generation of different prediction data corresponding to each sub-pel position allows for the possibility of conditioning the prediction signal to better match the signal in the current PU.

Interpolation filters 106 are designed to be linear phase with unit gain. A constant (unity) gain and linear phase properties are required to make sure interpolation filters 106 do not distort the signal. However, it may not be possible to have constant unity gain or perfect linear phase shift for all frequencies. Thus, interpolation filter 106 is designed to have the best linear phase filter with an appropriate phase slope or group delay with a closest phase response to unity that is flat and as wide as possible. For given sub-pel position (e.g., a given fractional phase offset), different trade-offs between "flatness" and "wideness" of frequency response result in different sub-pel interpolation filters 106. For example, for natural images, most of a signal is concentrated at low and middle frequencies, and it is generally preferred to have an interpolation filter 106 that is as flat as possible in the low and middle frequencies while the high frequencies may have more fluctuations. When taking into account noise cancellation, it may be preferred for interpolation filters 106 to attenuate frequencies where the noise is dominant. Usually, the shape of a noise depends on the picture content and the amount of compression. For example, compression noise for low quantization regimes may be flatter. In one embodiment, to reconcile between signal distortion and noise cancellation, it may be preferred to attenuate only frequencies where noise power is greater than the signal power.

Interpolation filters 106 include taps that weight full-pel pixel values with coefficient values that are used to determine the sub-pel pixel values for different sub-pel pixel positions. When a different interpolation filter 106 is used, the interpolation filter may use different values for coefficients and/or a different number of taps.

Particular embodiments design interpolation filters 106 based on joint sub-pel position information from multiple reference blocks. For example, for a current prediction block, bi-prediction may be performed using two reference blocks (from one or two pictures). The two reference blocks may be available from a list 0 and a list 1. Also, more than two reference blocks may be used. List 0 may be associated with a first reference block and list 1 may be associated with a second reference block. The sub-pel positions for both list 0 and list 1 are then used to determine interpolation filters 106 for both reference blocks.

In one example, if the first reference block is located 3.5 pixels vertically, then the motion vector may be 3 integer pixels and a half pixel. Also, the second reference block may be 1.25 pixels vertically, which is 1 integer pixel and a quarter pixel. Thus, as discussed above, an interpolation filter 106 needs to be used to interpolate the half-pel movement for the first reference block and the quarter-pel movement for the second reference block. Conventionally, a half-pel interpolation filter is used for the first reference block and a quarter-pel interpolation filter is used for the second reference block irrespective of whichever sub-pel position the other reference block is at. However, particular embodiments determine an interpolation filter 106 that is designed for a half-pel movement for the first reference block and a quarter-pel movement for the second block. That is, interpolation filter 106 is designed to take into account both sub-pel movements of both reference blocks.

Interpolation filters 106 may need to be designed for every combination for each list. For example, list 0 may have a first set of interpolation filters 106 designed for each combination and list 1 may have a second set of interpolation filters 106 designed for the each combination. For example, the following provides examples of coefficients for interpolation filters 106 for list 0 and list 1:

For List 0

$h_1(0, 0) = \{0, 0, 64, 0, 0, 0\}$
$h_1(0, 1) = \{6, -4, 68, -3, 4, -5\}$
$h_1(0, 2) = \{9, -6, 68, -6, 4, -2\}$
$h_1(0, 3) = \{6, -7, 67, -5, 4, -1\}$ $h_1(1,0)=\{-3, -6, 53, 22, -11, 7\}$
$h_1(1,1)=\{2, -9, 56, 19, -6, 2\}$
$h_1(1,2)=\{18, -20, 65, 11, 4, -9\}$
$h_1(1,3)=\{6, -14, 60, 17, -3, -3\}$
$h_1(2,0)=\{-2, -12, 41, 41, -10, 3\}$
$h_1(2,1)=\{-11, -3, 33, 48, -22, 14\}$
$h_1(2,2)=\{2, -10, 39, 40, -10, 3\}$
$h_1(2,3)=\{14, -22, 48, 31, -5, -10\}$
$h_1(3,0)=\{0, -9, 24, 55, -6, 0\}$
$h_1(3,1)=\{-2, -2, 16, 60, -15, 8\}$
$h_1(3,2)=\{-9, 4, 11, 66, -17, 17\}$
$h_1(3,3)=\{2, -7, 19, 56, -8, 2\}$
For List 1
$h_2(0,0)=\{0, 0, 64, 0, 0, 0\}$
$h_2(0,1)=\{-3, -6, 53, 22, -11, 7\}$
$h_2(0,2)=\{-2, -12, 41, 41, -10, 3\}$
$h_2(0,3)=\{0, -9, 24, 55, -6, 0\}$
$h_2(1,0)=\{6, -4, 68, -3, 4, -5\}$
$h_2(1,1)=\{2, -8, 56, 19, -7, 2\}$
$h_2(1,2)=\{-11, -3, 33, 48, -22, 14\}$
$h_2(1,3)=\{-2, -2, 16, 60, -15, 8\}$
$h_2(2,0)=\{9, -6, 68, -6, 4, -2\}$
$h_2(2,1)=\{18, -20, 65, 11, 4, -9\}$
$h_2(2,2)=\{3, -10, 40, 39, -10, 2\}$
$h_2(2,3)=\{-9, 4, 11, 66, -17, 17\}$
$h_2(3,0)=\{6, -7, 67, -5, 4, -1\}$
$h_2(3,1)=\{6, -14, 60, 17, -3, -3\}$
$h_2(3,2)=\{14, -22, 48, 31, -5, -10\}$
$h_2(3,3)=\{2, -6, 19, 56, -9, 2\}$ In the above interpolation filter design, there are four sub-pel values for each x and y direction. For example, the values could be 0: for no sub-pel motion refinement, 1: for quarter-pel motion refinement, 2: for half-pel motion refinement, and 3: for ¾-pel motion refinement. In the above, for the first reference block, if the first reference block is using half-pel motion refinement and the second reference block, for example from list 0, is using quarter-pel motion refinement, then the interpolation filter $H_1(2,1)$ is used. Additionally, for list 1, an interpolation filter of $H_2(2,1)$ is used. These interpolation filters 106 are designed jointly based on the sub-pel positions for both reference blocks. The example above shows an instance of jointly designed interpolation filter sets with complexity of 6 taps.

The following shows a calculation for determining an optimal interpolation filter 106 based on the first reference block and the second reference block. For bi-prediction of a PU, two reference blocks from List 0 and List 1 are available. Also, each reference block indicates a sub-pixel phase shift of $\alpha_1$ and $\alpha_2$ for List 0 and List 1 prediction, respectively. Furthermore a simple average would be conducted to generate the reference signal for prediction of current PU. The choice of filters for preprocessing of reference block before averaging takes place are noted by $H_1(\omega)$ and $H_2(\omega)$.

If the signal in the current PU is $S(\omega)$, and the two signals in the two reference blocks are $P_1(\omega)$ and $P_2(\omega)$, the following may be assumed as:

$$P_1(\omega)=S(\omega) \cdot e^{-i\alpha_1\omega}; \text{ and}$$

$$P_2(\omega)=S(\omega)=e^{-i\alpha_2\omega}.$$

The predicted signal would be $$P(\omega)=\frac{1}{2}[S(\omega) \cdot e^{-i\alpha_1\omega} \cdot H_1(\omega)+S(\omega) \cdot e^{-i\alpha_2\omega} \cdot H_2(\omega)].$$

For ideal prediction of $S(\omega)$, one needs to design $H_1(\omega)$ and $H_2(\omega)$ such that:

$$[e^{-i\alpha_1\omega} \cdot H_1(\omega)+e^{-i\alpha_2\omega} \cdot H_2(\omega)]=2.$$

The above formula shows that optimal $H_1(\omega)$ or $H_2(\omega)$, in general, depend on both $\alpha_1$ and $\alpha_2$. So the optimal interpolation filters for reference "i" in the general case that "n" references are available would have the form of XXXXXXXX $(1, \ldots, X) H_i(\alpha_1, \ldots, \alpha_n, \omega)$ $1 \in \{1, \ldots, n\}$.

Note that the same principle applies if any number of prediction blocks with variety of super-imposition (such as weighted averaging, etc.) would be used for derivation of final predicted signal.

Particular embodiments may also reduce the number of taps for interpolation filter 106. In some examples, the 6 taps may cover an area for the 8 taps, which will be described below. In a second example, as the two reference blocks should be, relatively, follow the corresponding pixels in the PU, with the exception of a sub-pixel shift, a complexity aware implementation of sub-pixel interpolation filters 106 can be designed by asymmetric filter coefficients for each predicted block, where right/top pixels are considered by filter coefficients from a first interpolation filter 106 applied to one of the reference blocks (e.g. from List 0) and the opposite (left/down) pixels are considered by a second interpolation filter 106 applied to the other reference blocks (e.g. from List 1). The delay for interpolation filters 106 in the example above is 3, which will be described in more detail below.

The area for 8 taps may be covered because the interpolation filter 106 for list 0 may be offset such that the coefficients of that filter apply to more pixels on the left and to less pixels on the right of the sub-pel pixel position to be interpolated and the interpolation filter 106 for list 1 may be offset such that the coefficients of that filter apply to more pixels on the right and less pixels to the left of the sub-pixel pixel position to be interpolated. FIG. 3 depicts an example showing an offset for interpolation filters 106 according to one embodiment. In FIG. 3, sub-pixel position FL of P1 and sub-pixel position H of P2 are used to predict pixel position L0 of S. The reference in P1 has a ¼ sub-pel shift and the reference in P2 has a ½ sub-pel shift, both relative to the pixels in S that is to be predicted by P1 and P2. The filter delay indicates the offset. For example, for 6 tap filters, a delay of "4" for list 0 indicates that four taps of interpolation filter 106 are to the left and two tap is to the right of the sub-pel position to be interpolated. At 350, for a first interpolation filter 106, taps for pixel positions at L3, L2, L1, and L0 are to the left of sub-pixel position FL. Taps for pixel positions R0 and R1 to the right of the sub-pixel position FL are also included in first interpolation filter 106. Taps for pixel positions R2 and R3 are not used.

A delay of "2" for list 1 indicates that two tap is to the left and four taps are to the right of the sub-pel position to be interpolated. At 352, for a second interpolation filter 106, taps for pixel positions at R0, R1, R2, and R3 are to the right of sub-pixel position H. Taps for pixel positions L0 and L1 to the left of the sub-pixel position H are also included in second interpolation filter 106. Taps for pixel positions L2 and L3 are not used.

Thus, the combination of filtering on list 0 and list 1 would cover 4 pixels to the right and 4 pixels to the left of the sub-pel position to be interpolated. This is equal to the area that a symmetric 8 tap filter covers. Particular embodiments use pixel positions L3 to R1 from a line P1 and use pixel positions L1 to R3 in a line P2 to predict pixel L0 in S. Other pixel values may also be interpolated. The value output by both interpolation filters 106 may be added and averaged and thus corresponds to an 8 tap filter area. This is because the pixel values determined for each interpolation filter 106 would be similar if symmetric 8-tap filters were used. For example, for a pixel position 1, the value would be similar if interpolated by two symmetric 8 tap interpolation filters 106, where each filter has a delay of 4.

The example below shows an instance of interpolation filters 106 that cover an area of an equivalent 8 tap filter with only 5 taps. Note that sample delay for list 0 is 4 (four) and for list 1 is 1 (one).

Figure 2:
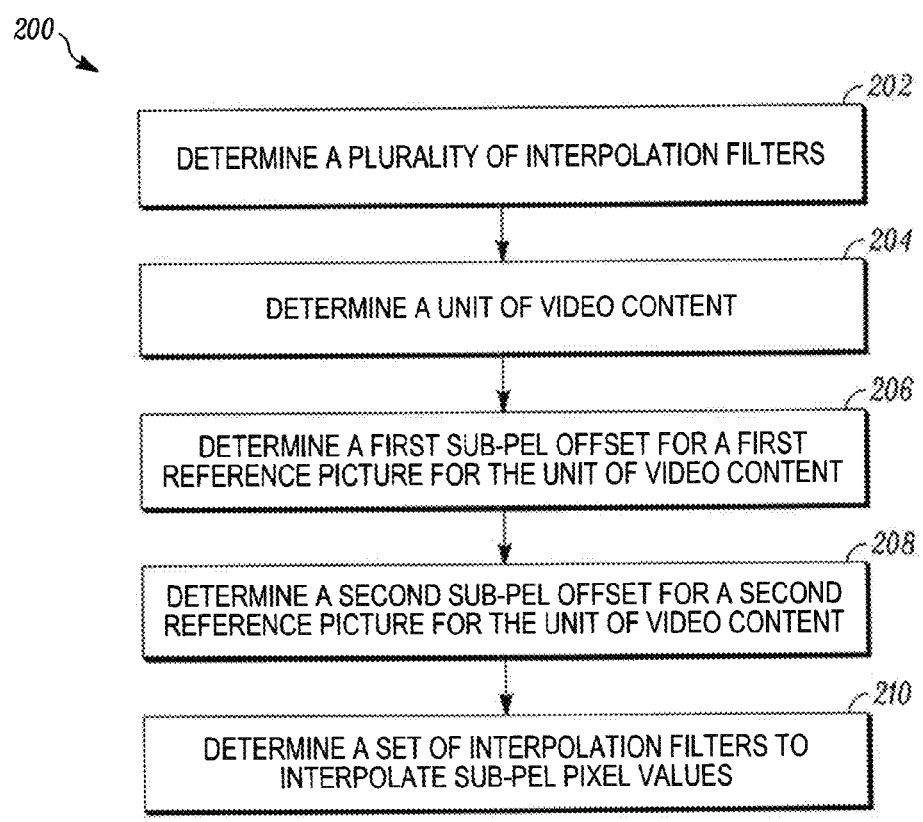
FIG. 2 depicts a simplified flowchart of a method for encoding or decoding video content according to one embodiment.

For List 0
$h_1(0, 0)=\{1, -3, 5, 61, 2\}$
$h_1(0, 1)=\{1, -2, -2, 62, 3\}$
$h_1(0, 2)=\{1, -2, -8, 65, 0\}$
$h_1(0, 3)=\{2, -5, 0, 62, 3\}$
$h_1(1, 0)=\{0, 1, -5, 60, 15\}$
$h_1(1, 1)=\{-1, 4, -13, 58, 15\}$
$h_1(1, 2)=\{-1, 4, -18, 60, 13\}$
$h_1(1, 3)=\{0, 1, -10, 60, 14\}$
$h_1(2, 0)=\{-2, 6, -13, 43, 40\}$
$h_1(2, 1)=\{-2, 7, -16, 38, 42\}$
$h_1(2, 2)=\{-2, 8, -21, 40, 39\}$
$h_1(2, 3)=\{-2, 7, -19, 43, 38\}$
$h_1(3, 0)=\{-1, 4, -9, 20, 57\}$
$h_1(3, 1)=\{-1, 4, -8, 10, 57\}$
$h_1(3, 2)=\{-2, 6, -12, 11, 60\}$
$h_1(3, 3)=\{-2, 6, -13, 16, 56\}$
For List 1
$h_2(0, 0)=\{61, 3, -3, 1, 0\}$
$h_2(0, 1)=\{56, 16, -9, 4, -1\}$
$h_2(0, 2)=\{40, 40, -11, 4, -1\}$
$h_2(0, 3)=\{15, 58, -8, 1, 0\}$
$h_2(1, 0)=\{60, 1, -6, 3, -1\}$
$h_2(1, 1)=\{58, 15, -12, 6, -2\}$
$h_2(1, 2)=\{40, 42, -16, 5, -1\}$
$h_2(1, 3)=\{13, 60, -11, 1, 0\}$
$h_2(2, 0)=\{62, -6, -4, 3, -1\}$
$h_2(2, 1)=\{58, 9, -12, 6, -2\}$
$h_2(2, 2)=\{39, 40, -21, 8, -2\}$
$h_2(2, 3)=\{15, 59, -15, 2, 0\}$
$h_2(3, 0)=\{60, -2, -2, 2, -1\}$
$h_2(3, 1)=\{60, 11, -8, 4, -1\}$
$h_2(3, 2)=\{39, 37, -16, 7, -2\}$
$h_2(3, 3)=\{16, 57, -10, 2, 0\}$ FIG. 2 depicts a simplified flowchart 200 of a method for encoding or decoding video content according to one embodiment. At 202, the method determines a plurality of interpolation filters 106 for use in interpolating sub-pel values for a temporal prediction process of video content. Interpolation filters 106 are designed based on sub-pel offsets for two reference blocks. At 204, the method determines a unit of video content. For example, a PU is received. At 206, a first sub-pel offset for a first reference block for the unit of video content is determined. At 208, a second sub-pel offset for a second reference block for the unit of video content is determined. For example, the sub-pel offsets may be quarter-pel and half-pel for the first and the second references, respectively. At 210, the method determines a set of interpolation filters 106 to interpolate a set of sub-pel pixel values for use in the temporal prediction process for the unit of video content. The set of interpolation filters 106 are designed for the first sub-pel offset and the second sub-pel offset and used to interpolate a first sub-pel pixel value for the first reference block and a second sub-pel value for the second reference block. For example, a first interpolation filter 106 is determined from a first list 0 and a second interpolation filter 106 is determined from a second list 1.

The following describes different examples of interpolation filters 106. It will be understood that other examples may be appreciated.

Four, Five, and Six Tap Interpolation Filter Examples

In the following examples, an interpolation filter 106 can cover up to an area of an equivalent 8 tap filter with only 4, 5, or 6 taps. Note that sample delay for each filter is indicated in front of the set.

Example 1

The example below shows an instance of jointly designed interpolation filter sets with complexity of 4 taps. Note that sample delay for each filter is indicated in front of the set.
For List 0
$h_1(0, 0)=\{0, 64, 0, 0\}$: delay 2
$h_1(0, 1)=\{-1, 3, -9, 65\}$: delay 4
$h_1(0, 2)=\{6, -5, 68, -8\}$: delay 3
$h_1(0, 3)=\{65, -9, 3, -1\}$: delay 1
$h_1(1, 0)=\{60, 13, -5, 2\}$: delay 1
$h_1(1, 1)=\{-3, 7, -17, 61\}$: delay 4
$h_1(1, 2)=\{4, -19, 63, 9\}$: delay 3
$h_1(1, 3)=\{1, -10, 61, 14\}$: delay 3
$h_1(2, 0)=\{-11, 41, 39, -2\}$: delay 2
$h_1(2, 1)=\{38, 43, -14, 4\}$: delay 1
$h_1(2, 2)=\{7, -22, 40, 39\}$: delay 3
$h_1(2, 3)=\{4, -14, 43, 35\}$: delay 3
$h_1(3, 0)=\{2, -5, 13, 60\}$: delay 3
$h_1(3, 1)=\{12, 60, -12, 2\}$: delay 1
$h_1(3, 2)=\{9, 65, -17, 3\}$: delay 1
$h_1(3, 3)=\{61, -17, 7, -3\}$: delay 0
For List 1
$h_2(0, 0)=\{0, 64, 0, 0\}$: delay 2
$h_2(0, 1)=\{60, 13, -5, 2\}$: delay 1
$h_2(0, 2)=\{-11, 41, 39, -2\}$: delay 2
$h_2(0, 3)=\{2, -5, 13, 60\}$: delay 3
$h_2(1, 0)=\{-1, 3, -9, 65\}$: delay 4
$h_2(1, 1)=\{59, 27, -10, 4\}$: delay 1
$h_2(1, 2)=\{38, 43, -14, 4\}$: delay 1
$h_2(1, 3)=\{12, 60, -12, 2\}$: delay 1
$h_2(2, 0)=\{6, -5, 68, -8\}$: delay 3
$h_2(2, 1)=\{4, -19, 63, 9\}$: delay 3
$h_2(2, 2)=\{39, 40, -22, 7\}$: delay 1
$h_2(2, 3)=\{9, 65, -17, 3\}$: delay 1
$h_2(3, 0)=\{65, -9, 3, -1\}$: delay 1
$h_2(3, 1)=\{1, -10, 61, 14\}$: delay 3
$h_2(3, 2)=\{4, -14, 43, 35\}$: delay 3
$h_2(3, 3)=\{4, -10, 27, 59\}$: delay 3

Example 2

The example below shows an instance of jointly designed interpolation filter sets with complexity of 5 taps. Note that sample delay for each filter is indicated in front of the set.
For List 0
$h_1(0, 0)=\{0, 0, 64, 0, 0\}$: delay 3
$h_1(0, 1)=\{58, -1, -5, 3, -1\}$: delay 1
$h_1(0, 2)=\{1, -2, -8, 65, 0\}$: delay 4
$h_1(0, 3)=\{1, -3, 0, 67, -1\}$: delay 4
$h_1(1, 0)=\{-1, 3, -8, 65, 15\}$: delay 4
$h_1(1, 1)=\{-1, 5, -15, 59, 14\}$: delay 4
$h_1(1, 2)=\{0, 2, -15, 61, 15\}$: delay 4
$h_1(1, 3)=\{0, 1, -10, 60, 11\}$: delay 4
$h_1(2, 0)=\{-1, 4, -11, 40, 38\}$: delay 4
$h_1(2, 1)=\{37, 41, -17, 5, -1\}$: delay 1
$h_1(2, 2)=\{-3, 10, -24, 42, 38\}$: delay 4
$h_1(2, 3)=\{-1, 5, -17, 40, 40\}$: delay 4
$h_1(3, 0)=\{11, 58, -7, 3, -1\}$: delay 1
$h_1(3, 1)=\{0, 12, 63, -10, 1\}$: delay 2

$h_1(3, 2)=\{0, 16, 59, -16, 2\}$: delay 2
$h_1(3, 3)=\{-2, 6, -12, 15, 59\}$: delay 4
For List 1
$h_2(0, 0)=\{0, 0, 64, 0, 0\}$: delay 3
$h_2(0, 1)=\{-1, 3, -8, 65, 15\}$: delay 4
$h_2(0, 2)=\{40, 40, -11, 4, -1\}$: delay 1
$h_2(0, 3)=\{11, 58, -7, 3, -1\}$: delay 1
$h_2(1, 0)=\{58, -1, -5, 3, -1\}$: delay 1
$h_2(1, 1)=\{59, 15, -12, 6, -2\}$: delay 1
$h_2(1, 2)=\{37, 41, -17, 5, -1\}$: delay 1
$h_2(1, 3)=\{12, 63, -10, 1, 0\}$: delay 1
$h_2(2, 0)=\{66, -6, -4, 3, -1\}$: delay 1
$h_2(2, 1)=\{2, -15, 61, 15, 0\}$: delay 3
$h_2(2, 2)=\{40, 40, -21, 8, -2\}$: delay 1
$h_2(2, 3)=\{16, 59, -16, 2, 0\}$: delay 1
$h_2(3, 0)=\{1, -3, 0, 67, -1\}$: delay 4
$h_2(3, 1)=\{0, 1, -10, 60, 11\}$: delay 4
$h_2(3, 2)=\{-1, 5, -17, 40, 40\}$: delay 4
$h_2(3, 3)=\{14, 59, -15, 6, -2\}$: delay 1

Example 3

The example below shows an instance of jointly designed interpolation filter 106 sets with complexity of 6 taps. Note that sample delay for each filter is indicated in front of the set.
For List 0
$h_1(0, 0)=\{0, 0, 64, 0, 0, 0\}$: delay 3
$h_1(0, 1)=\{-1, 4, 0, 62, 0, 1\}$: delay 4
$h_1(0, 2)=\{4, -2, 64, -1, 2, -4\}$: delay 3
$h_1(0, 3)=\{0, 62, 0, 4, -1, 0\}$: delay 2
$h_1(1, 0)=\{-9, 61, 15, -7, 3, -1\}$: delay 2
$h_1(1, 1)=\{-7, 59, 15, -6, 6, -2\}$: delay 2
$h_1(1, 2)=\{-2, 9, -8, 59, 14, -5\}$: delay 4
$h_1(1, 3)=\{-1, 6, -11, 60, 14, -5\}$: delay 4
$h_1(2, 0)=\{1, -11, 40, 41, -13, 7\}$: delay 3
$h_1(2, 1)=\{-12, 39, 41, -13, 8, -2\}$: delay 2
$h_1(2, 2)=\{-4, 11, -12, 40, 39, -11\}$: delay 4
$h_1(2, 3)=\{-2, 8, -13, 41, 39, -12\}$: delay 4
$h_1(3, 0)=\{-1, 3, -6, 15, 61, -9\}$: delay 4
$h_1(3, 1)=\{-5, 15, 60, -10, 6, -1\}$: delay 2
$h_1(3, 2)=\{-5, 14, 59, -8, 9, -2\}$: delay 2
$h_1(3, 3)=\{-6, 14, 59, -8, 6, -2\}$: delay 2
For List 1
$h_2(0, 0)=\{0, 0, 64, 0, 0, 0\}$: delay 3
$h_2(0, 1)=\{-9, 61, 15, -7, 3, -1\}$: delay 2
$h_2(0, 2)=\{1, -11, 40, 41, -13, 7\}$: delay 3
$h_2(0, 3)=\{-1, 3, -6, 15, 61, -9\}$: delay 4
$h_2(1, 0)=\{-1, 4, 0, 62, 0, 1\}$: delay 4
$h_2(1, 1)=\{-2, 6, -8, 59, 14, -6\}$: delay 4
$h_2(1, 2)=\{-12, 39, 41, -13, 8, -2\}$: delay 2
$h_2(1, 3)=\{-5, 15, 60, -10, 6, -1\}$: delay 2
$h_2(2, 0)=\{4, -2, 64, -1, 2, -4\}$: delay 3
$h_2(2, 1)=\{-2, 9, -8, 59, 14, -5\}$: delay 4
$h_2(2, 2)=\{-11, 40, 40, -11, 10, -3\}$: delay 2
$h_2(2, 3)=\{-5, 14, 59, -8, 9, -2\}$: delay 2
$h_2(3, 0)=\{0, 62, 0, 4, -1, 0\}$: delay 2
$h_2(3, 1)=\{-1, 6, -11, 60, 14, -5\}$: delay 4
$h_2(3, 2)=\{-2, 8, -13, 41, 39, -12\}$: delay 4
$h_2(3, 3)=\{-2, 6, -6, 15, 59, -7\}$: delay 4

Six and Eight Tap Interpolation Filter Examples

Example 1

The example below shows an instance of an interpolation filter 106 that can cover an area of up to an equivalent 12 tap conventional filter with only 6 taps.

The following is noted and may be used:
1—To show the alignment of each 6 tap interpolation filter 106 based on an equivalent 12 tap interpolation filter 106 with 6 tap delay, the 6 coefficients are put in a 12 tap array.
2—The joint sub-pixel position for each interpolation filter 106 is appended at the end of the filter coefficients.
3—The overall filter direct current (DC) gain for this example is 128 (requiring 7 bits integer coefficients.)
For List 0
$\{0, 0, 0, 0, 0, 128, 0, 0, 0, 0, 0, 0\}$, //(0, 0)
$\{0, 0, -2, 6, -15, 119, 29, -13, 0, 0, 0, 0\}$, //(1, 0)
$\{0, 0, -4, 10, -21, 75, 84, -25, 0, 0, 0, 0\}$, //(2, 0)
$\{0, 0, 0, 0, -13, 29, 119, -15, 6, -2, 0, 0\}$, //(3, 0)
$\{0, 0, 0, 0, 0, 127, 0, 2, 5, -3, 1, 0\}$, //(0, 1)
$\{0, 0, 0, 0, 0, 117, 30, -14, 14, -7, 2, 0\}$, //(1, 1)
$\{0, 0, 0, 0, -21, 79, 84, -31, 11, -3, 0, 0\}$, //(2, 1)
$\{0, 0, 0, 0, -13, 26, 121, -17, 13, -2, 0, 0\}$, //(3, 1)
$\{0, 0, 0, 0, 0, 132, -7, 12, 1, -2, 1, 0\}$, //(0, 2)
$\{0, 1, -6, 20, -24, 124, 22, 0, 0, 0, 0, 0\}$, //(1, 2)
$\{0, 3, -11, 23, -48, 82, 78, 0, 0, 0, 0, 0\}$, //(2, 2)
$\{0, 0, 0, 0, 0, 26, 122, -20, 19, -5, 1, 0\}$, //(3, 2)
$\{1, -3, 5, 2, 0, 127, 0, 0, 0, 0, 0, 0\}$, //(0, 3)
$\{0, 0, -2, 13, -17, 121, 26, -13, 0, 0, 0, 0\}$, //(1, 3)
$\{0, 0, -5, 14, -35, 84, 78, -23, 0, 0, 0, 0\}$, //(2, 3)
$\{0, 2, -7, 14, -14, 30, 117, 0, 0, 0, 0, 0\}$, //(3, 3)
For List 1
$\{0, 0, 0, 0, 0, 128, 0, 0, 0, 0, 0, 0\}$, //(0, 0)
$\{0, 0, -2, 6, -15, 119, 29, -13, 0, 0, 0, 0\}$, //(0, 1)
$\{0, 0, -4, 10, -21, 75, 84, -25, 0, 0, 0, 0\}$, //(0, 2)
$\{0, 0, 0, 0, -13, 29, 119, -15, 6, -2, 0, 0\}$, //(0, 3)
$\{0, 0, 0, 0, 0, 127, 0, 2, 5, -3, 1, 0\}$, //(1, 0)
$\{0, 0, -4, 12, -30, 119, 29, -12, 0, 0, 0, 0\}$, //(1, 1)
$\{0, 0, 0, 0, -21, 79, 84, -31, 11, -3, 0, 0\}$, //(1, 2)
$\{0, 0, 0, 0, -13, 26, 121, -17, 13, -2, 0, 0\}$, //(1, 3)
$\{0, 0, 0, 0, 0, 132, -7, 12, 1, -2, 1, 0\}$, //(2, 0)
$\{0, 1, -6, 20, -24, 124, 22, 0, 0, 0, 0, 0\}$, //(2, 1)
$\{0, 0, 0, 0, 0, 79, 81, -46, 21, -9, 3, 0\}$, //(2, 2)
$\{0, 0, 0, 0, 0, 26, 122, -20, 19, -5, 1, 0\}$, //(2, 3)
$\{1, -3, 5, 2, 0, 127, 0, 0, 0, 0, 0, 0\}$, //(3, 0)
$\{0, 0, -2, 13, -17, 121, 26, -13, 0, 0, 0, 0\}$, //(3, 1)
$\{0, 0, -5, 14, -35, 84, 78, -23, 0, 0, 0, 0\}$, //(3, 2)
$\{0, 0, 0, 0, -12, 29, 119, -30, 12, -4, 0, 0\}$, //(3, 3)

Example 2

The example below shows an instance of jointly designed interpolation filter 106 sets with complexity of 6 taps with different frequency characteristics from the filter in Example 1.
The following is noted and may be used:
1—To show the alignment of each 6 tap interpolation filter 106 based on an equivalent 12 tap interpolation filter 106 with 6 tap delay, the 6 coefficients are put in a 12 tap array.
2—The joint sub-pixel position for each interpolation filter 106 is appended at the end of the filter coefficients.
3—The overall filter DC gain for this example is 64 (requiring 6 bits integer coefficients.)
For List 0
$\{0, 0, 0, 0, 0, 64, 0, 0, 0, 0, 0, 0\}$, //(0, 0)
$\{0, 0, 0, 0, -9, 60, 14, -6, 3, -1, 0, 0\}$, //(1, 0)
$\{0, 0, -2, 5, -11, 38, 41, -14, 0, 0, 0, 0\}$, //(2, 0)
$\{0, 0, -1, 3, -6, 14, 60, -9, 0, 0, 0, 0\}$, //(3, 0)
$\{0, 0, -1, 4, 0, 64, 0, 0, 0, 0, 0, 0\}$, //(0, 1)
$\{0, 1, -3, 7, -17, 62, 12, 0, 0, 0, 0, 0\}$, //(1, 1)
$\{0, 0, 0, 0, -9, 40, 43, -16, 6, -2, 0, 0\}$, //(2, 1)

{0, 0, 0, 0, -4, 13, 61, -10, 5, -1, 0, 0}, //(3, 1)
{0, 0, 0, 0, 0, 66, -2, 7, 0, -1, 1, 0}, //(0, 2)
{0, 1, -3, 9, -13, 61, 11, 0, 0, 0, 0, 0}, //(1, 2)
{0, 0, 0, 0, 0, 37, 43, -24, 12, -6, 2, 0}, //(2, 2)
{0, 0, 0, 0, 0, 11, 61, -10, 10, -3, 1, 0}, //(3, 2)
{0, 0, 0, 0, 0, 64, 0, 4, -1, 0, 0, 0}, //(0, 3)
{0, 0, -1, 5, -10, 61, 13, -4, 0, 0, 0, 0}, //(1, 3)
{0, 0, -2, 6, -16, 43, 39, -12, 0, 0, 0, 0}, //(2, 3)
{0, 1, -3, 6, -11, 15, 58, 0, 0, 0, 0, 0}, //(3, 3)
For List 1
{0, 0, 0, 0, 0, 64, 0, 0, 0, 0, 0, 0}, //(0, 0)
{0, 0, 0, 0, -9, 60, 14, -6, 3, -1, 0, 0}, //(0, 1)
{0, 0, -2, 5, -11, 38, 41, -14, 0, 0, 0, 0}, //(0, 2)
{0, 0, -1, 3, -6, 14, 60, -9, 0, 0, 0, 0}, //(0, 3)
{0, 0, -1, 4, 0, 64, 0, 0, 0, 0, 0, 0}, //(1, 0)
{0, 0, 0, 0, 0, 58, 15, -11, 6, -3, 1, 0}, //(1, 1)
{0, 0, 0, 0, -9, 40, 43, -16, 6, -2, 0, 0}, //(1, 2)
{0, 0, 0, 0, -4, 13, 61, -10, 5, -1, 0, 0}, //(1, 3)
{0, 0, 0, 0, 0, 66, -2, 7, 0, -1, 1, 0}, //(2, 0)
{0, 1, -3, 9, -13, 61, 11, 0, 0, 0, 0, 0}, //(2, 1)
{0, 2, -6, 12, -24, 43, 37, 0, 0, 0, 0, 0}, //(2, 2)
{0, 0, 0, 0, 0, 11, 61, -10, 10, -3, 1, 0}, //(2, 3)
{0, 0, 0, 0, 0, 64, 0, 4, -1, 0, 0, 0}, //(3, 0)
{0, 0, -1, 5, -10, 61, 13, -4, 0, 0, 0, 0}, //(3, 1)
{0, 0, -2, 6, -16, 43, 39, -12, 0, 0, 0, 0}, //(3, 2)
{0, 0, 0, 0, 0, 12, 62, -17, 7, -3, 1, 0}, //(3, 3)

Example 3

The example below shows an instance of jointly designed filter sets with complexity of 8 taps that can cover the same area up to, a conventional 16 tap filter for bi-prediction.
The following is noted and may be used:
1—To show the alignment of each 8 tap interpolation filter 106 based on an equivalent 16 tap interpolation filter 106 with 8 tap delay, the 8 coefficients are put in a 16 tap array.
2—The joint sub-pixel position for each filter is appended at the end of the filter coefficients.
3—The overall filter DC gain for this example is 64 (requiring 6 bits Integer coefficients.)
For List 0
{0, 0, 0, 0, 0, 0, 0, 64, 0, 0, 0, 0, 0, 0, 0, 0}, //(0, 0)
{0, 0, 0, 0, 0, 0, -5, 59, 18, -9, 6, -4, 2, -1, 0, 0}, //(1, 0)
{0, 0, 0, 0, 0, 0, -11, 38, 43, -13, 6, -3, 1, 0, 0, 0}, //(2, 0)
{0, 0, -1, 2, -4, 6, -9, 18, 59, -5, 0, 0, 0, 0, 0, 0}, //(3, 0)
{1, -2, 2, -2, 2, 0, 0, 61, 0, 0, 0, 0, 0, 0, 0, 0}, //(0, 1) {0, 0, 0, 1, -3, 7, -9, 60, 14, -6, 3, 0, 0, 0, 0, 0}, //(1, 1)
{0, 0, -1, 3, -6, 10, -13, 40, 40, -11, 0, 0, 0, 0, 0, 0}, //(2, 1)
{0, 1, -2, 3, -5, 7, -10, 12, 59, 0, 0, 0, 0, 0, 0, 0}, //(3, 1)
{1, -2, 3, -4, 4, 1, 2, 62, 0, 0, 0, 0, 0, 0, 0, 0}, //(0, 2)
{0, 0, 0, 0, 0, 0, -7, 60, 13, -4, 7, -5, 3, -1, 0, 0}, //(1, 2)
{0, 0, 0, 2, -6, 12, -12, 40, 40, -12, 6, 0, 0, 0, 0, 0}, //(2, 2)
{0, 1, -2, 4, -6, 8, -5, 12, 58, 0, 0, 0, 0, 0, 0, 0}, //(3, 2)
{0, 0, 0, 0, 0, 0, 0, 61, 0, 0, 2, -2, 2, -2, 1, 0}, //(0, 3)
{0, 0, 0, 0, 0, 0, 0, 57, 12, -11, 9, -7, 5, -3, 1, 0}, //(1, 3)
{0, 0, 0, 0, 0, 0, -11, 43, 38, -18, 10, -6, 3, -1, 0, 0}, //(2, 3)
{0, 0, 0, 0, 0, 3, -6, 14, 60, -9, 7, -3, 1, 0, 0, 0}, //(3, 3)
For List 1
{0, 0, 0, 0, 0, 0, 0, 64, 0, 0, 0, 0, 0, 0, 0, 0}, //(0, 0)
{0, 0, 0, 0, 0, 0, -5, 59, 18, -9, 6, -4, 2, -1, 0, 0}, //(0, 1)
{0, 0, 0, 0, 0, 0, -11, 38, 43, -13, 6, -3, 1, 0, 0, 0}, //(0, 2)
{0, 0, -1, 2, -4, 6, -9, 18, 59, -5, 0, 0, 0, 0, 0, 0}, //(0, 3)
{1, -2, 2, -2, 2, 0, 0, 61, 0, 0, 0, 0, 0, 0, 0, 0}, //(1, 0)
{0, 0, 0, 0, 0, 0, -7, 59, 14, -6, 4, -4, 2, -1, 0, 0}, //(1, 1)
{0, 0, -1, 3, -6, 10, -13, 40, 40, -11, 0, 0, 0, 0, 0, 0}, //(1, 2)
{0, 1, -2, 3, -5, 7, -10, 12, 59, 0, 0, 0, 0, 0, 0, 0}, //(1, 3)
{1, -2, 3, -4, 4, 1, 2, 62, 0, 0, 0, 0, 0, 0, 0, 0}, //(2, 0)
{0, 0, 0, 0, 0, 0, -7, 60, 13, -4, 7, -5, 3, -1, 0, 0}, //(2, 1)
{0, 0, 0, 0, 0, 0, -12, 40, 40, -12, 6, -6, 3, -1, 0, 0}, //(2, 2)
{0, 1, -2, 4, -6, 8, -5, 12, 58, 0, 0, 0, 0, 0, 0, 0}, //(2, 3)
{0, 0, 0, 0, 0, 0, 0, 61, 0, 0, 2, -2, 2, -2, 1, 0}, //(3, 0)
{0, 0, 0, 0, 0, 0, 0, 57, 12, -11, 9, -7, 5, -3, 1, 0}, //(3, 1)
{0, 0, 0, 0, 0, 0, -11, 43, 38, -18, 10, -6, 3, -1, 0, 0}, //(3, 2)
{0, 0, -1, 2, -4, 4, -6, 14, 59, -7, 0, 0, 0, 0, 0, 0}, //(3, 3)

First Set of Additional Filter Examples

Example 1

This example shows an instance of such filter can cover an area of up to an equivalent 8 tap filter with only 4 taps. Note that sample delay for each filter is indicated in front of the set.
For List 0
$h_1(0, 0)=\{0, 64, 0, 0\}$: delay 2
$h_1(0, 1)=\{-1, 3, -9, 65\}$: delay 4
$h_1(0, 2)=\{6, -5, 68, -8\}$: delay 3
$h_1(0, 3)=\{65, -9, 3, -1\}$: delay 1
$h_1(1, 0)=\{60, 13, -5, 2\}$: delay 1
$h_1(1, 1)=\{-3, 7, -17, 61\}$: delay 4
$h_1(1, 2)=\{4, -19, 63, 9\}$: delay 3
$h_1(1, 3)=\{1, -10, 61, 14\}$: delay 3
$h_1(2, 0)=\{-11, 41, 39, -2\}$: delay 2
$h_1(2, 1)=\{38, 43, -14, 4\}$: delay 1
$h_1(2, 2)=\{7, -22, 40, 39\}$: delay 3
$h_1(2, 3)=\{4, -14, 43, 35\}$: delay 3
$h_1(3, 0)=\{2, -5, 13, 60\}$: delay 3
$h_1(3, 1)=\{12, 60, -12, 2\}$: delay 1
$h_1(3, 2)=\{9, 65, -17, 3\}$: delay 1
$h_1(3, 3)=\{61, -17, 7, -3\}$: delay 0
For List 1
$h_2(0, 0)=\{0, 64, 0, 0\}$: delay 2
$h_2(0, 1)=\{60, 13, -5, 2\}$: delay 1
$h_2(0, 2)=\{-11, 41, 39, -2\}$: delay 2
$h_2(0, 3)=\{2, -5, 13, 60\}$: delay 3
$h_2(1, 0)=\{-1, 3, -9, 65\}$: delay 4
$h_2(1, 1)=\{59, 27, -10, 4\}$: delay 1
$h_2(1, 2)=\{38, 43, -14, 4\}$: delay 1
$h_2(1, 3)=\{12, 60, -12, 2\}$: delay 1
$h_2(2, 0)=\{6, -5, 68, -8\}$: delay 3
$h_2(2, 1)=\{4, -19, 63, 9\}$: delay 3
$h_2(2, 2)=\{39, 40, -22, 7\}$: delay 1
$h_2(2, 3)=\{9, 65, -17, 3\}$: delay 1
$h_2(3, 0)=\{65, -9, 3, -1\}$: delay 1
$h_2(3, 1)=\{1, -10, 61, 14\}$: delay 3
$h_2(3, 2)=\{4, -14, 43, 35\}$: delay 3
$h_2(3, 3)=\{4, -10, 27, 59\}$: delay 3

Example 2

The example below shows an instance of jointly designed interpolation filter 106 sets with complexity of 5 taps. Note that sample delay for each filter is indicated in front of the set.
For List 0
$h_1(0, 0)=\{0, 0, 64, 0, 0\}$: delay 3
$h_1(0, 1)=\{58, -1, -5, 3, -1\}$: delay 1
$h_1(0, 2)=\{1, -2, -8, 65, 0\}$: delay 4
$h_1(0, 3)=\{1, -3, 0, 67, -1\}$: delay 4
$h_1(1, 0)=\{-1, 3, -8, 65, 15\}$: delay 4
$h_1(1, 1)=\{-1, 5, -15, 59, 14\}$: delay 4
$h_1(1, 2)=\{0, 2, -15, 61, 15\}$: delay 4
$h_1(1, 3)=\{0, 1, -10, 60, 11\}$: delay 4
$h_1(2, 0)=\{-1, 4, -11, 40, 38\}$: delay 4
$h_1(2, 1)=\{37, 41, -17, 5, -1\}$: delay 1

$h_1(2, 2)=\{-3, 10, -24, 42, 38\}$: delay 4
$h_1(2, 3)=\{-1, 5, -17, 40, 40\}$: delay 4
$h_1(3, 0)=\{11, 58, -7, 3, -1\}$: delay 1
$h_1(3, 1)=\{0, 12, 63, -10, 1\}$: delay 2
$h_1(3, 2)=\{0, 16, 59, -16, 2\}$: delay 2
$h_1(3, 3)=\{-2, 6, -12, 15, 59\}$: delay 4
For List 1
$h_2(0, 0)=\{0, 0, 64, 0, 0\}$: delay 3
$h_2(0, 1)=\{-1, 3, -8, 65, 15\}$: delay 4
$h_2(0, 2)=\{40, 40, -11, 4, -1\}$: delay 1
$h_2(0, 3)=\{11, 58, -7, 3, -1\}$: delay 1
$h_2(1, 0)=\{58, -1, -5, 3, -1\}$: delay 1
$h_2(1, 1)=\{59, 15, -12, 6, -2\}$: delay 1
$h_2(1, 2)=\{37, 41, -17, 5, -1\}$: delay 1
$h_2(1, 3)=\{12, 63, -10, 1, 0\}$: delay 1
$h_2(2, 0)=\{66, -6, -4, 3, -1\}$: delay 1
$h_2(2, 1)=\{2, -15, 61, 15, 0\}$: delay 3
$h_2(2, 2)=\{40, 40, -21, 8, -2\}$: delay 1
$h_2(2, 3)=\{16, 59, -16, 2, 0\}$: delay 1
$h_2(3, 0)=\{1, -3, 0, 67, -1\}$: delay 4
$h_2(3, 1)=\{0, 1, -10, 60, 11\}$: delay 4
$h_2(3, 2)=\{-1, 5, -17, 40, 40\}$: delay 4
$h_2(3, 3)=\{14, 59, -15, 6, -2\}$: delay 1

Example 3

The example below shows an instance of jointly designed filter sets with complexity of 6 taps. Note that sample delay for each filter is indicated in front of the set.
For List 0
$h_1(0, 0)=\{0, 0, 64, 0, 0, 0\}$: delay 3
$h_1(0, 1)=\{-1, 4, 0, 62, 0, 1\}$: delay 4
$h_1(0, 2)=\{4, -2, 64, -1, 2, -4\}$: delay 3
$h_1(0, 3)=\{0, 62, 0, 4, -1, 0\}$: delay 2
$h_1(1, 0)=\{-9, 61, 15, -7, 3, -1\}$: delay 2
$h_1(1, 1)=\{-7, 59, 15, -6, 6, -2\}$: delay 2
$h_1(1, 2)=\{-2, 9, -8, 59, 14, -5\}$: delay 4
$h_1(1, 3)=\{-1, 6, -11, 60, 14, -5\}$: delay 4
$h_1(2, 0)=\{1, -11, 40, 41, -13, 7\}$: delay 3
$h_1(2, 1)=\{-12, 39, 41, -13, 8, -2\}$: delay 2
$h_1(2, 2)=\{-4, 11, -12, 40, 39, -11\}$: delay 4
$h_1(2, 3)=\{-2, 8, -13, 41, 39, -12\}$: delay 4
$h_1(3, 0)=\{-1, 3, -6, 15, 61, -9\}$: delay 4
$h_1(3, 1)=\{-5, 15, 60, -10, 6, -1\}$: delay 2
$h_1(3, 2)=\{-5, 14, 59, -8, 9, -2\}$: delay 2
$h_1(3, 3)=\{-6, 14, 59, -8, 6, -2\}$: delay 2
For List 1
$h_2(0, 0)=\{0, 0, 64, 0, 0, 0\}$: delay 3
$h_2(0, 1)=\{-9, 61, 15, -7, 3, -1\}$: delay 2
$h_2(0, 2)=\{1, -11, 40, 41, -13, 7\}$: delay 3
$h_2(0, 3)=\{-1, 3, -6, 15, 61, -9\}$: delay 4
$h_2(1, 0)=\{-1, 4, 0, 62, 0, 1\}$: delay 4
$h_2(1, 1)=\{-2, 6, -8, 59, 14, -6\}$: delay 4
$h_2(1, 2)=\{-12, 39, 41, -13, 8, -2\}$: delay 2
$h_2(1, 3)=\{-5, 15, 60, -10, 6, -1\}$: delay 2
$h_2(2, 0)=\{4, -2, 64, -1, 2, -4\}$: delay 3
$h_2(2, 1)=\{-2, 9, -8, 59, 14, -5\}$: delay 4
$h_2(2, 2)=\{-11, 40, 40, -11, 10, -3\}$: delay 2
$h_2(2, 3)=\{-5, 14, 59, -8, 9, -2\}$: delay 2
$h_2(3, 0)=\{0, 62, 0, 4, -1, 0\}$: delay 2
$h_2(3, 1)=\{-1, 6, -11, 60, 14, -5\}$: delay 4
$h_2(3, 2)=\{-2, 8, -13, 41, 39, -12\}$: delay 4
$h_2(3, 3)=\{-2, 6, -6, 15, 59, -7\}$: delay 4

Combined 6 and 8 Tap Filter Examples

Particular embodiments combine one set of filters (e.g. 6 tap) based on joint sub-pixel interpolation filter design for bi-prediction, with another set of filters (e.g., 8 tap) based on conventional single prediction filters. In the interpolation filtering scheme, if the sub-pixel offset in one of the two references is zero, then the interpolation filtering can be conducted as in a conventional way, which cancels the phase in each reference by filters designed for uni-prediction (i.e. sub-pixel interpolation for single reference).

Example 1

In this example, particular embodiments lower the memory access overhead for interpolation filtering. In one embodiment, the joint sub-pixel interpolation filters 106 are 6 taps and interpolation filters 106 for performing uni-prediction are 8 taps. Combining the uni-prediction and joint-bi-prediction interpolation filters 106 may improve the memory access overhead. For example, in a case where for a bi-prediction, one of the reference frames has a zero sub-pixel phase offset and the other reference frame has a non-zero phase offset, if joint-bi-prediction interpolation filters 106 are used for filtering, then it requires $(6-1)\times 2=10$ pixel overhead for memory access in each horizontal and vertical direction in which the filter applies. If bi-prediction is conducted by only performing uni-prediction filtering on the non-zero sub-pel offset reference (Note that the reference with zero offset would not need to be filtered in this case) the overhead required for interpolation for an 8 tap interpolation filter 106 is only $8-1=7$ pixels in each horizontal and vertical direction in which the filter applies. This example shows how much memory bandwidth can be saved by combining joint-sub-pixel interpolation filters (usually shorter taps) and those for simple uni-prediction (usually larger taps).

The filters listed in this example combine the joint-bi-prediction filters with simple (non-joint) prediction filters to achieve complexity reduction.

The following is noted and may be used:
1—To show the alignment of each 6 tap or 8 tap interpolation filter 106 based on an equivalent 12 tap interpolation filter 106 with 6 tap delay, the 6 coefficients are put in a 12 tap array.
2—The joint sub-pixel position for each interpolation filter 106 is appended at the end of the filter coefficients.
3—The overall filter DC gain for this example is 64 (requiring 6 bits Integer coefficients.)

For List 0
$\{0, 0, 0, 0, 0, 64, 0, 0, 0, 0, 0, 0\}$, //(0, 0)
$\{0, 0, -1, 3, -8, 60, 13, -4, 1, 0, 0, 0\}$, //(1, 0)
$\{0, 0, -1, 4, -11, 40, 40, -11, 4, -1, 0, 0\}$, //(2, 0)
$\{0, 0, 0, 1, -4, 13, 60, -8, 3, -1, 0, 0\}$, //(3, 0)
$\{0, 0, 0, 0, 0, 64, 0, 0, 0, 0, 0, 0\}$, //(0, 1)
$\{0, 1, -3, 7, -17, 62, 12, 0, 0, 0, 0, 0\}$, //(1, 1)
$\{0, 0, 0, 0, -9, 40, 43, -16, 6, -2, 0, 0\}$, //(2, 1)
$\{0, 0, 0, 0, -4, 13, 61, -10, 5, -1, 0, 0\}$, //(3, 1)
$\{0, 0, 0, 0, 0, 64, 0, 0, 0, 0, 0, 0\}$, //(0, 2)
$\{0, 1, -3, 9, -13, 61, 11, 0, 0, 0, 0, 0\}$, //(1, 2)
$\{0, 0, 0, 0, 0, 37, 43, -24, 12, -6, 2, 0\}$, //(2, 2)
$\{0, 0, 0, 0, 0, 11, 61, -10, 10, -3, 1, 0\}$, //(3, 2)
$\{0, 0, 0, 0, 0, 64, 0, 0, 0, 0, 0, 0\}$, //(0, 3)
$\{0, 0, -1, 5, -10, 61, 13, -4, 0, 0, 0, 0\}$, //(1, 3)
$\{0, 0, -2, 6, -16, 43, 39, -12, 0, 0, 0, 0\}$, //(2, 3)
$\{0, 1, -3, 6, -11, 15, 58, 0, 0, 0, 0, 0\}$, //(3, 3)
For List 1
$\{0, 0, 0, 0, 0, 64, 0, 0, 0, 0, 0, 0\}$, //(0, 0)
$\{0, 0, -1, 3, -8, 60, 13, -4, 1, 0, 0, 0\}$, //(0, 1)
$\{0, 0, -1, 4, -11, 40, 40, -11, 4, -1, 0, 0\}$, //(0, 2)
$\{0, 0, 0, 1, -4, 13, 60, -8, 3, -1, 0, 0\}$, //(0, 3)
$\{0, 0, 0, 0, 0, 64, 0, 0, 0, 0, 0, 0\}$, //(1, 0)
$\{0, 0, 0, 0, 0, 58, 15, -11, 6, -3, 1, 0\}$, //(1, 1)

{0, 0, 0, 0, -9, 40, 43, -16, 6, -2, 0, 0}, //(1, 2)
{0, 0, 0, 0, -4, 13, 61, -10, 5, -1, 0, 0}, //(1, 3)
{0, 0, 0, 0, 0, 64, 0, 0, 0, 0, 0, 0}, //(2, 0)
{0, 1, -3, 9, -13, 61, 11, 0, 0, 0, 0, 0}, //(2, 1)
{0, 2, -6, 12, -24, 43, 37, 0, 0, 0, 0, 0}, //(2, 2)
{0, 0, 0, 0, 0, 11, 61, -10, 10, -3, 1, 0}, //(2, 3)
{0, 0, 0, 0, 0, 64, 0, 0, 0, 0, 0, 0}, //(3, 0)
{0, 0, -1, 5, -10, 61, 13, -4, 0, 0, 0, 0}, //(3, 1)
{0, 0, -2, 6, -16, 43, 39, -12, 0, 0, 0, 0}, //(3, 2)
{0, 0, 0, 0, 0, 12, 62, -17, 7, -3, 1, 0}, //(3, 3)
Filter Example with Constrained DC-gain In one embodiment, interpolation filters 106 are based on the joint sub-pixel interpolation filter design for bi-prediction, with the additional requirement that each single interpolation filter 106, applied to a reference block, has the same DC-gain as other filters in the set of filters. The requirements would disallow for individual interpolation filters 106 in a pair of joint interpolation filter set (e.g. for position (¼, ½)) to have different DC-gain although interpolation filters 106 have a fixed sum of DC-gains as in previous examples (i.e., in the earlier examples, the overall DC-gain after adding the two filtered references was the same for all filter pairs in a set). This constraint makes it possible to have smaller size memory for holding the temporary filtered predictions before adding the two predictions and averaging them and shifting them.

Example 1

Interpolation filters 106 listed in this example combine the joint-bi-prediction 6 tap filters with simple (non-joint) 8 tap filters.
The following is noted and may be used:
  1—To show the alignment of each 6tap or 8 tap interpolation filter 106 based on an equivalent 12 tap interpolation filter 106 with 6tap delay, the coefficients are put in a 12 tap array.
  2—The joint sub-pixel position for each interpolation filter 106 is appended at the end of the filter coefficients.
  3—The filter DC gain for each interpolation filter 106 is 64 (requiring 6 bits integer coefficients.)
For List 0
{0, 0, 0, 0, 0, 64, 0, 0, 0, 0, 0, 0}, //(0, 0)
{0, 0, -1, 3, -8, 60, 13, -4, 1, 0, 0, 0}, //(1, 0)
{0, 0, -1, 4, -11, 40, 40, -11, 4, -1, 0, 0}, //(2, 0)
{0, 0, 0, 1, -4, 13, 60, -8, 3, -1, 0, 0}, //(3, 0)
{0, 0, 0, 0, 0, 64, 0, 0, 0, 0, 0, 0}, //(0, 1)
{0, 1, -3, 6, -15, 61, 14, 0, 0, 0, 0, 0}, //(1, 1)
{0, 0, 0, 0, -9, 40, 44, -15, 6, -2, 0, 0}, //(2, 1)
{0, 0, 0, 0, -4, 13, 61, -10, 5, -1, 0, 0}, //(3, 1)
{0, 0, 0, 0, 0, 64, 0, 0, 0, 0, 0, 0}, //(0, 2)
{0, 1, -3, 9, -13, 61, 9, 0, 0, 0, 0, 0}, //(1, 2)
{0, 0, 0, 0, 0, 37, 43, -24, 12, -6, 2, 0}, //(2, 2)
{0, 0, 0, 0, 0, 10, 60, -12, 8, -2, 0, 0}, //(3, 2)
{0, 0, 0, 0, 0, 64, 0, 0, 0, 0, 0, 0}, //(0, 3)
{0, 0, -1, 5, -10, 61, 13, -4, 0, 0, 0, 0}, //(1, 3)
{0, 0, -2, 6, -16, 45, 39, -8, 0, 0, 0, 0}, //(2, 3)
{0, 1, -3, 6, -12, 15, 57, 0, 0, 0, 0, 0}, //(3, 3)
For List 1
{0, 0, 0, 0, 0, 64, 0, 0, 0, 0, 0, 0}, //(0, 0)
{0, 0, -1, 3, -8, 60, 13, -4, 1, 0, 0, 0}, //(0, 1)
{0, 0, -1, 4, -11, 40, 40, -11, 4, -1, 0, 0}, //(0, 2)
{0, 0, 0, 1, -4, 13, 60, -8, 3, -1, 0, 0}, //(0, 3)
{0, 0, 0, 0, 0, 64, 0, 0, 0, 0, 0, 0}, //(1, 0)
{0, 0, 0, 0, 0, 57, 15, -12, 6, -3, 0}, //(1, 1)
{0, 0, 0, 0, -9, 40, 44, -15, 6, -2, 0, 0}, //(1, 2)
{0, 0, 0, 0, -4, 13, 61, -10, 5, -1, 0, 0}, //(1, 3)
{0, 0, 0, 0, 0, 64, 0, 0, 0, 0, 0, 0}, //(2, 0)
{0, 1, -3, 9, -13, 61, 9, 0, 0, 0, 0, 0}, //(2, 1)
{0, 2, -6, 12, -24, 43, 37, 0, 0, 0, 0, 0}, //(2, 2)
{0, 0, 0, 0, 0, 10, 60, -12, 8, -2, 0, 0}, //(2, 3)
{0, 0, 0, 0, 0, 64, 0, 0, 0, 0, 0, 0}, //(3, 0)
{0, 0, -1, 5, -10, 61, 13, -4, 0, 0, 0, 0}, //(3, 1)
{0, 0, -2, 6, -16, 45, 39, -8, 0, 0, 0, 0}, //(3, 2)
{0, 0, 0, 0, 0, 14, 61, -15, 6, -3, 0}, //(3, 3)

Filter Example Based on Number of Predictor Blocks

Figure 4A:
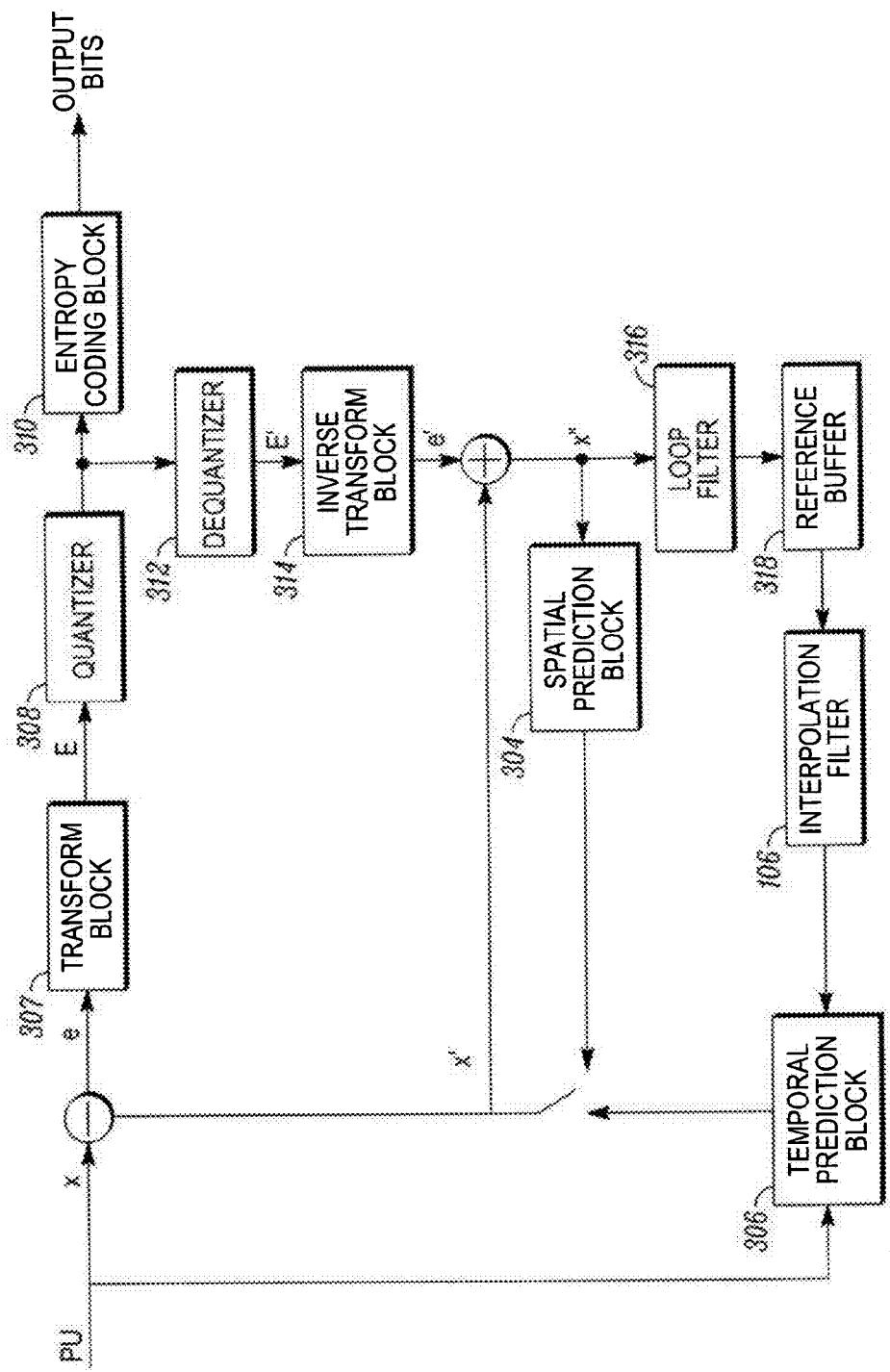
FIG. 4A depicts an example of an encoder for providing temporal prediction based on one or more references according to one embodiment.

In one embodiment, the choice of sub-pixel interpolation filter 106 would depend on the number of reference blocks. The following is noted and may be used:
1—In case there is only one reference block for prediction particular embodiments use one of the filter designs for uni-prediction, such as filter designs described in U.S. patent application Ser. No. 13/532,217, entitled "Selection of Phase Offsets For Interpolation Filters for Motion Compensation", filed on Jun. 25, 2012, which is incorporated by reference in its entirety for all purposes, to increase the accuracy and performance of the motion compensation.
2—For bi-predictive motion compensation cases, joint interpolation filters 106 would be used. These joint sub-pel interpolation filters 106 (JSPIFs) provide much wider pass-band with reduced number of filter-taps and hence lower complexity (compared to those filters used in conventional sub-pixel interpolation).
Encoder and Decoder Examples FIG. 4A depicts an example of an encoder 102 for providing temporal prediction based on one or more references according to one embodiment. A general operation of encoder 102 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 304 may include different spatial prediction directions per PU, such as horizontal, vertical, 45-degree diagonal, 135-degree diagonal, DC (flat averaging), and planar.

A temporal prediction block 306 performs temporal prediction through a motion estimation and motion compensation operation. The motion estimation operation searches for a best match prediction for the current PU over reference blocks. The best match prediction is described by a motion vector (MV) and associated reference block (refIdx). The motion vector and associated reference block are included in the coded bit stream. In motion compensation, a best match prediction for the current PU is determined using the MV and refIdx.

Transform block 307 performs a transform operation with the residual PU, e. Transform block 307 outputs the residual PU in a transform domain, E.

A quantizer 308 then quantizes the transform coefficients of the residual PU, E. Quantizer 308 converts the transform coefficients into a finite number of possible values. Entropy coding block 310 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 102, a de-quantizer 312 de-quantizes the quantized transform coefficients of the residual PU. De-quantizer 312 then outputs the de-quantized transform coefficients, E'. An inverse transform block 314 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 316 performs de-blocking on the reconstructed PU, x", to reduce blocking artifacts. Additionally, loop filter 316 may perform a sample adaptive offset process after the completion of the de-blocking filter process for the decoded picture, which compensates for a pixel value offset between reconstructed pixels and original pixels. Also, loop filter 316 may perform adaptive filtering over the reconstructed PU, which minimizes coding distortion between the input and output pictures. Additionally, if the reconstructed pictures are reference blocks, the reference blocks are stored in a reference buffer 318 for future temporal prediction.

Interpolation filter 106 interpolates sub-pel pixel values for temporal prediction block 306. Temporal prediction block 306 uses the sub-pel pixel values to generate a prediction of a current PU.

Figure 4B:
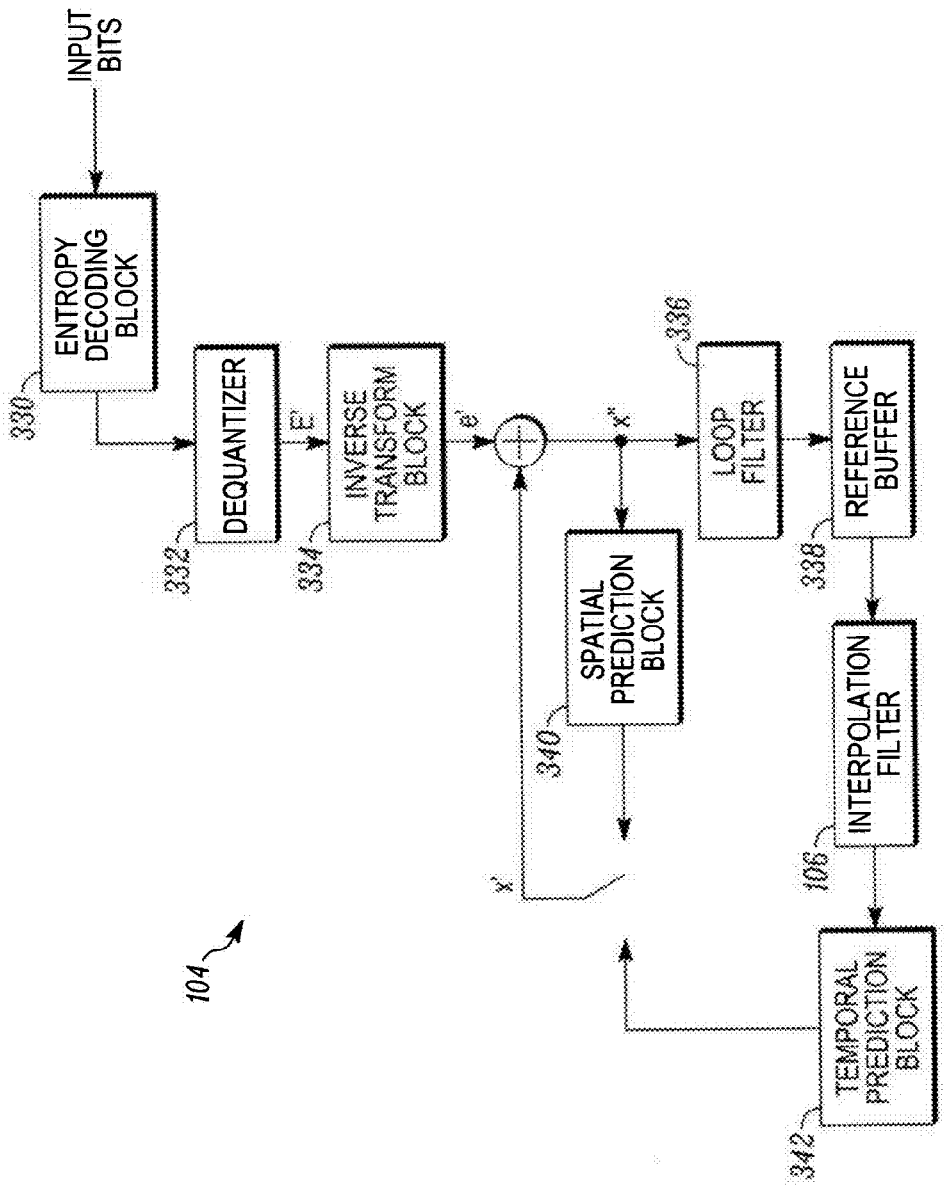
FIG. 4B depicts an example of a decoder for providing temporal prediction based on one or more references according to one embodiment.

FIG. 4B depicts an example of decoder 104 for providing temporal prediction based on one or more references according to one embodiment. A general operation of decoder 104 will now be described. It will be understood that variations on the decoding process described will be appreciated by a person skilled in the art based on the disclosure and teachings herein. Decoder 104 receives input bits from encoder 102 for compressed video content.

An entropy decoding block 330 performs entropy decoding on input bits corresponding to quantized transform coefficients of a residual PU. A de-quantizer 332 de-quantizes the quantized transform coefficients of the residual PU. De-quantizer 332 then outputs the de-quantized transform coefficients of the residual PU, E'. An inverse transform block 334 receives the de-quantized transform coefficients, which are then inverse transformed resulting in a reconstructed residual PU, e'.

The reconstructed PU, e', is then added to the corresponding prediction, x', either spatial or temporal, to form the new constructed PU, x". A loop filter 336 performs de-blocking on the reconstructed PU, x", to reduce blocking artifacts. Additionally, loop filter 336 may perform a sample adaptive offset process after the completion of the de-blocking filter process for the decoded picture, which compensates for a pixel value offset between reconstructed pixels and original pixels. Also, loop filter 336 may perform an adaptive loop filter over the reconstructed PU, which minimizes coding distortion between the input and output pictures. Additionally, if the reconstructed pictures are reference blocks, the reference blocks are stored in a reference buffer 338 for future temporal prediction.

The prediction PU, x', is obtained through either spatial prediction or temporal prediction. A spatial prediction block 340 may receive decoded spatial prediction directions per PU, such as horizontal, vertical, 45-degree diagonal, 135-degree diagonal, DC (flat averaging), and planar. The spatial prediction directions are used to determine the prediction PU, x'.

Interpolation filter 106 interpolates sub-pel pixel values for input into a temporal prediction block 342. Temporal prediction block 342 performs temporal prediction through a motion estimation and motion compensation operation. A decoded motion vector or a motion vector derived from other motion information is then used to determine the prediction PU, x'.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for encoding or decoding video content, the method comprising:
   determining a plurality of interpolation filters for use in interpolating sub-pel values for a temporal prediction process of video content, wherein each interpolation filter of at least some of the plurality of interpolation filters is designed for a respective combination of sub-pel offsets for two reference blocks, the sub-pel offsets representing respective sub-pel motion for each of the two reference blocks;
   determining, by a computing device, a first sub-pel offset for a first reference block for a first block of video content;
   determining, by the computing device, a second sub-pel offset for a second reference block for the first block of video content, the second reference block different from the first reference block;
   determining, by the computing device, a set of interpolation filters to interpolate a set of sub-pel pixel values for use in the temporal prediction process for the first block of video content by comparing the first sub-pel offset and the second sub-pel offset to combinations of the sub-pel offsets within the plurality of interpolation filters;
   interpolating a first sub-pel pixel value for the first reference block;
   interpolating a second sub-pel value for the second reference block; and
   averaging the first sub-pel pixel value and the second sub-pel pixel value for the temporal prediction process for the first block; wherein the first sub-pel offset has a zero value and the second sub-pel offset has a non-zero value, and uni-prediction is used in interpolating the second sub-pel offset value.

2. The method of claim 1, wherein:
   the plurality of interpolation filters include a first portion of interpolation filters that are used for a first list of reference pictures for the temporal prediction process; and
   the plurality of interpolation filters include a second portion of interpolation filters that are used for a second list of reference pictures for the temporal prediction process; wherein:
   each interpolation filter from the first portion of interpolation filters forms a pair of interpolation filters with a respective interpolation filter from the second portion of interpolation filters, each pair of interpolation filters associated with a unique combination of sub-pel offsets for the two reference blocks.

3. The method of claim 1, wherein the plurality of interpolation filters is designed for all combinations of available sub-pel offsets for each of the two reference blocks.

4. The method of claim 2, wherein each filter forming a pair of interpolation filters comprises:
a first filter from the first portion of interpolation filters designed with a first delay to cover a first portion of pixel values; and
determining a second filter from the second portion of interpolation filters designed with a second delay to cover a second portion of pixel values; and
wherein the first portion of pixel values is different from the second portion of pixel values.

5. The method of claim 4, wherein:
the first filter from the first portion of interpolation filters and the second filter from the second portion of interpolation filters include a first number of taps
such that they filter cover a pixel area larger than the first number of taps due to the first delay and the second delay.

6. The method of claim 5, wherein the area covered is equivalent to using an interpolation filter with a second number of taps different from the first number of taps.

7. The method of claim 1, wherein:
interpolation filters for uni-prediction and bi-prediction are included in the plurality of interpolation filters; and
interpolation filters using uni-prediction include a different number of taps from interpolation filters using bi-prediction.

8. The method of claim 2, wherein a sum of a direct current (DC) gain is fixed for each pair of interpolation filters.

9. The method of claim 2, wherein the direct current (DC) gain is fixed for each pair of interpolation filters.

10. An apparatus configured to encode or decode video content, the apparatus comprising:
one or more computer processors; and
a computer-readable storage medium comprising instructions, that when executed, control the one or more computer processors to be configured for:
determining a plurality of interpolation filters for use in interpolating sub-pel values for a temporal prediction process of video content, wherein each interpolation filter of at least some of the plurality of interpolation filters is designed for a respective combination of sub-pel offsets for two reference blocks, the sub-pel offsets representing respective sub-pel motion for each of the two reference blocks;
determining a first sub-pel offset for a first reference block for a first block of video content;
determining a second sub-pel offset for a second reference block for the first block of video content, the second reference block different from the first reference block;
determining a set of interpolation filters to interpolate a set of sub-pel pixel values for use in the temporal prediction process for the first block of video content by comparing the first sub-pel offset and the second sub-pel offset to combinations of the sub-pel offsets within the plurality of interpolation filters; wherein determining the set of interpolation filters comprises:
determining a first interpolation filter for the first reference block, the first interpolation filter designed with a first delay to cover a first portion of pixel values, the first delay indicating how many taps of the first interpolation filter are to one side of a sub-pel position to be interpolated using the first reference block and how many taps of the interpolation filter are to the other side of the sub-pel position to be interpolated using the first reference block; and
determining a second interpolation filter for the second reference block, the second interpolation filter designed with a second delay to cover a second portion of pixel values, the second delay indicating how many taps of the second interpolation filter are to one side of the sub-pel position to be interpolated using the second reference block and how many taps of the interpolation filter are to the other side of the sub-pel position to be interpolated using the second reference block; wherein:
the first portion of pixel values is different from the second portion of pixel values;
interpolating a first sub-pel pixel value for the first reference block using the first interpolation filter;
interpolating a second sub-pel value for the second reference block using the second interpolation filter; and
averaging the first sub-pel pixel value and the second sub-pel pixel value for the temporal prediction process for the first block.

11. The apparatus of claim 10, wherein:
the plurality of interpolation filters include a first portion of interpolation filters that are used for a first list of reference pictures for the temporal prediction process;
the plurality of interpolation filters include a second portion of interpolation filters that are used for a second list of reference pictures for the temporal prediction process; and
each interpolation filter from the first portion of interpolation filters forms a pair of interpolation filters with a respective interpolation filter from the second portion of interpolation filters, each pair of interpolation filters associated with a unique combination of sub-pel offsets for the two reference blocks; wherein:
the first interpolation filter is selected from the first portion of interpolation filters and the second interpolation filter is selected from the second portion of interpolation filters such that the first interpolation filter and the second interpolation filter comprise one of the pairs of interpolation filters whose combination of the sub-pel offsets matches the first sub-pel offset and the second sub-pel offset.

12. The apparatus of claim 10, wherein the plurality of interpolation filters comprises a first set of interpolation filters and a second set of interpolation filters, the first interpolation filter selected from the first set of interpolation filters and the second interpolation filter selected from the second set of interpolation filters, and each of the first set of interpolation filters and the second set of interpolation filters designed for all combinations of available sub-pel offsets for each of the first reference block and the second reference block.

13. The apparatus of claim 10, wherein:
the first interpolation filter and the second interpolation filter include a first number of taps; and
the first interpolation filter and the second interpolation filter cover a pixel area larger than the first number of taps due to the first delay and the second delay.

14. The apparatus of claim 13, wherein the area covered is equivalent to using an interpolation filter with a second number of taps when no delay is used.

15. A non-transitory computer-readable storage medium comprising instructions for encoding or decoding video content, the instructions, when executed, control a computer system to be operable for:
- determining a plurality of interpolation filters for use in interpolating sub-pel values for a temporal prediction process of video content, wherein each interpolation filter of at least some of the plurality of interpolation filters is designed for a respective combination of sub-pel offsets for two reference blocks, the sub-pel offsets representing respective sub-pel motion for each of the two reference blocks;
- determining a first sub-pel offset for a first reference block for a first block of video content;
- determining a second sub-pel offset for a second reference block for the first block of video content, the second reference block different from the first reference block; and
- determining a set of interpolation filters to interpolate a set of sub-pel pixel values for use in the temporal prediction process for the first block of video content by comparing the first sub-pel offset and the second sub-pel offset to combinations of the sub-pel offsets within the plurality of interpolation filters;
- interpolating a first sub-pel pixel value for the first reference block; and
- interpolating a second sub-pel value for the second reference block, wherein the plurality of interpolation filters is designed for all combinations of available sub-pel offsets for each of the first reference block and the second reference block.

16. The non-transitory computer-readable storage medium of claim 15, wherein the instructions for determining the set of interpolation filters comprises:
- determining a first interpolation filter for the first reference block, the first interpolation filter designed with a first delay to cover a first portion of pixel values; and
- determining a second interpolation filter for the second reference block, the second interpolation filter designed with a second delay to cover a second portion of pixel values; and
- the first portion of pixel values is different from the second portion of pixel values.

17. The non-transitory computer-readable storage medium of claim 15, wherein when one of the first sub-pel offset or the second sub-pel offset has no phase shift, uni-prediction is used to interpolate one of the first sub-pel offset or the second sub-pel offset that has a phase shift.

18. The method of claim 1, wherein each interpolation filter of the at least some of the plurality of interpolation filters includes a sample delay that indicates how many taps of the interpolation filter are to one side of a sub-pel position to be interpolated and how many taps of the interpolation filter are to the other side of the sub-pel position to be interpolated.

19. The apparatus of claim 10, wherein the combinations of the sub-pel offsets within the plurality of interpolation filters comprise respective combinations for the two reference blocks having zero sub-pel motion, ¼-pel motion, ½-pel motion, and ¾-pel motion.

* * * * *